(12) United States Patent
Kwon

(10) Patent No.: US 8,068,856 B2
(45) Date of Patent: Nov. 29, 2011

(54) MOBILE COMMUNICATION TERMINAL EQUIPPED WITH LOCATION-BASED SHORT MESSAGE SERVICE SYSTEM, LOCATION-BASED MESSAGE GENERATION METHOD AND LOCATION-BASED MESSAGE DISPLAY METHOD

(75) Inventor: Sung-Hun Kwon, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 776 days.

(21) Appl. No.: 11/195,748

(22) Filed: Aug. 3, 2005

(65) Prior Publication Data

US 2006/0040678 A1    Feb. 23, 2006

(30) Foreign Application Priority Data

Aug. 17, 2004  (KR) .................. 10-2004-0064762

(51) Int. Cl.
    *H04W 24/00*    (2009.01)
(52) U.S. Cl. .................. 455/456.3; 455/414.2; 455/466
(58) Field of Classification Search .............. 455/404.1, 455/404.2, 456.1–457, 412.1, 412.2, 414.1, 455/414.2, 414.3, 466, 566; 380/258; 705/67, 705/14.4, 14.49, 14.67; 713/155; 709/206
See application file for complete search history.

(56) References Cited

U.S. PATENT DOCUMENTS

| | | | | |
|---|---|---|---|---|
| 4,970,714 A | * | 11/1990 | Chen et al. | 370/216 |
| 6,085,068 A | * | 7/2000 | Eaton et al. | 340/7.22 |
| 6,590,887 B1 | * | 7/2003 | Lee | 370/342 |
| 7,277,719 B2 | * | 10/2007 | Klassen et al. | 455/466 |
| 7,321,779 B2 | * | 1/2008 | Kang | 455/466 |
| 7,496,370 B2 | * | 2/2009 | Bhaumick | 455/456.5 |
| 2003/0119441 A1 | * | 6/2003 | Simons et al. | 455/3.01 |
| 2004/0242202 A1 | * | 12/2004 | Torvinen | 455/412.1 |
| 2005/0096069 A1 | * | 5/2005 | Lee | 455/456.5 |
| 2005/0124388 A1 | * | 6/2005 | Seo et al. | 455/566 |
| 2005/0227711 A1 | * | 10/2005 | Orwant et al. | 455/456.3 |
| 2006/0078122 A1 | * | 4/2006 | Dacosta | 380/258 |
| 2007/0140439 A1 | * | 6/2007 | Olrik et al. | 379/67.1 |
| 2008/0268895 A1 | * | 10/2008 | Foxenland | 455/550.1 |

FOREIGN PATENT DOCUMENTS

KR    10-2005-0008329    1/2005

* cited by examiner

*Primary Examiner* — Anthony Addy
(74) *Attorney, Agent, or Firm* — H.C. Park & Associates, PLC

(57) ABSTRACT

Disclosed herein are a mobile communication terminal equipped with a location-based short message service (SMS) system, a location-based message generation method and a location-based message display method. The mobile communication terminal having a location-based SMS (short message service) system includes a message sending module which receives from the message sender a message content, a telephone number of a mobile communication terminal of a designated message recipient, and a message mode, generates from location information received from the sender an SMS message containing the message content, mode identification information based on the message mode, and the location information if the message mode selected by the message sender is a location-based message mode rather than a general message mode, and sends to an SMS server the generated SMS message which is set to be forwarded to the telephone number of the message recipient's mobile communication terminal as a destination.

12 Claims, 4 Drawing Sheets

MOBILE COMMUNICATION TERMINAL EQUIPPED WITH LOCATION-BASED SHORT MESSAGE SERVICE SYSTEM, LOCATION-BASED MESSAGE GENERATION METHOD AND LOCATION-BASED MESSAGE DISPLAY METHOD

BACKGROUND OF THE INVENTION

This application claims the priority of Korean Patent Application No. 2004-64762, filed on Aug. 17, 2004, in the Korean Intellectual Property Office, the disclosure of which is incorporated herein in its entirety by reference.

FIELD OF THE INVENTION

The present invention relates to a mobile communication terminal equipped with a location-based short message service system, a location-based message generation method, and a location-based message display method.

DESCRIPTION OF THE RELATED ART

Short message service (SMS) is a service available on a digital mobile communication terminal that permits sending of SMS messages between mobile communication terminals, other handheld devices, and fixed line phones.

SMS offers a sending time reservation service. That is, a message sender can write an SMS message and reserve a sending time of the SMS message so that the sender's mobile communication terminal or an SMS server can send the SMS message to a designated recipient at the reserved time.

Conventionally, a service has been proposed which sends the same SMS message simultaneously to mobile communication terminals located in a specific region using region information. This service is typically used for commercial purposes, e.g., for a specific company's purpose of providing an advertisement or distributing discount coupons to mobile communication terminals located within a certain range of the company's place of business.

The present invention provides a mobile communication terminal equipped with a location-based SMS system capable of offering a reservation function in conjunction with a specific location.

For instance, when a subscriber using a mobile communication terminal equipped with the location-based SMS system sends an SMS message containing the subscriber's work schedule for tomorrow at the subscriber's site, together with the location of the subscriber's site used as location information, to the subscriber's mobile communication terminal, the subscriber can receive the SMS message through the subscriber's mobile communication terminal when the subscriber arrives at the subscriber's site next day.

SUMMARY OF THE INVENTION

The present invention provides a mobile communication terminal equipped with a location-based SMS system, a location-based message generation method and a location-based message display method, allowing a message to be displayed on a mobile communication terminal of a message recipient when the recipient's terminal enters into a location designated by a message sender.

In accordance with an aspect of the present invention, there is provided a mobile communication terminal having a location-based SMS (short message service) system including a message sending module which receives from the message sender a message content, a telephone number of a mobile communication terminal of a designated message recipient, and a message mode, generates from location information received from the sender an SMS message containing the message content, mode identification information based on the message mode, and the location information if the message mode selected by the message sender is a location-based message mode rather than a general message mode, and sends to an SMS server the generated SMS message which is set to be forwarded to the telephone number of the message recipient's mobile communication terminal as a destination.

The message sending module may include: an input unit which allows the message sender to input the message content and the telephone number of the mobile communication terminal of the designated message recipient; a mode selection unit which allows the message sender to select the general message mode or location-based message mode; a location information management unit which receives the location information from the message sender when the location-based message mode is selected in the mode selection unit; an SMS message generation unit which generates an SMS message containing the message content inputted through the input unit and mode identification information based on the message mode selected through the mode selection unit, and, if the selected message mode is the location-based message mode, further containing the location information inputted through the location information management unit; and a message transmission unit which transmits to the SMS server the generated SMS message which is set to be forwarded to the telephone number of the message recipient's mobile communication terminal as a destination.

The location-based SMS system may further include a location information storage unit which offers location information to the message sender and stores information regarding a location retrieved and selected by the message sender from the offered location information in a memory.

The location information management unit may be adapted to receive the location information stored by the location information storage unit from the memory according to the message sender's selection.

In accordance with another aspect of the present invention, there is provided a mobile communication terminal having a location-based SMS system including a message receiving module which determines from mode identification information contained in an SMS message received from an SMS server whether the SMS message is a general message or location-based message, and, if the SMS message is determined to be the location-based message, outputs the SMS message when the mobile communication terminal of a message recipient enters into a location corresponding to location information contained in the received SMS message.

The message receiving module may include: a message reception unit which receives the SMS message from the SMS server; a message storage unit which stores the received SMS message in a memory; a mode determination unit which determines from mode identification information contained in the received SMS message whether the SMS message is a general message or location-based message; a general message processing unit which outputs the received SMS message if the SMS message is determined by the mode determination unit to be a general message; and a location-based message processing unit which outputs the SMS message if the received SMS message is determined by the mode determination unit to be a location-based message when the message recipient's mobile communication terminal enters into a location corresponding to location information contained in the SMS message.

The location-based message processing unit may be adapted to determine whether the message recipient's mobile communication terminal has entered into the location corresponding to the location information contained in the SMS message, by periodically monitoring locations of the recipient's mobile communication terminal based on location information obtained from a base station of a mobile communication system communicating with the recipient's mobile communication terminal.

The location-based message processing unit may be adapted to determine whether the message recipient's mobile communication terminal has entered into the location corresponding to the location information contained in the SMS message, by periodically monitoring locations of the recipient's mobile communication terminal through a GPS (global positioning system) incorporated in the recipient's mobile communication terminal.

In accordance with a further aspect of the present invention, there is provided a location-based message generation method including the steps of: a) inputting a message content and a telephone number of a mobile communication terminal of a designated message recipient through a UI (user interface) offered to a message sender; b) selecting a message mode according to the message sender's selection through the UI offered to the message sender to select a general message mode or a location-based message mode; c) inputting location information through a UI offered to the message sender to input the location information upon selection of the location-based message mode by the message sender, the location information being information regarding a location in which an SMS message is to be displayed on a message recipient's mobile communication terminal when the message recipient's mobile communication terminal having received the SMS message enters into the location; d) generating an SMS message containing the message content and mode identification information indicating a general message mode if a mode selected in the step b) is a general message mode; e) generating an SMS message containing the message content, mode identification information indicating a location-based message mode, and location information if a mode selected in the step b) is a location-based message mode; and f) sending the SMS message generated in the step d) or e), which is set to be forwarded to the telephone number of the message recipient's mobile communication terminal as a destination.

The location-based message generation method may further include offering location information to the message sender and storing information regarding a location selected by the sender from the offered location information in a memory.

The step of inputting location information may include reading and inputting the location information stored in the memory according to the message sender's selection.

In accordance with a further aspect of the present invention, there is provided a location-based message display method including the steps of: a) receiving an SMS message from an SMS server in a mobile communication system; b) storing the received SMS message in a memory of a mobile communication terminal of a message recipient; c) determining from mode identification information contained in the received SMS message whether the SMS message is a general message or a location-based message; d) displaying the received SMS message on the message recipient's mobile communication terminal so that the message recipient can view the message content if the received SMS message is determined to be a general message; and e) monitoring periodically whether the message recipient's mobile communication terminal has entered into a location corresponding to location information contained in the received SMS message if the SMS message is determined to be a location-based message, reading and outputting the SMS message stored in the memory of the message recipient's mobile communication terminal so that the message recipient can view the message content when the recipient's mobile communication terminal has entered into the location corresponding to the location information contained in the SMS message.

The step of monitoring periodically may include determining whether the message recipient's mobile communication terminal has entered into the location corresponding to the location information contained in the SMS message, by periodically monitoring locations of the recipient's mobile communication terminal based on location information from a base station in a mobile communication system communicating with the recipient's mobile communication terminal.

The step of monitoring periodically may include determining whether the message recipient's mobile communication terminal has entered into the location corresponding to the location information contained in the SMS message, by periodically monitoring locations of the recipient's mobile communication terminal through a GPS incorporated in the recipient's mobile communication terminal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
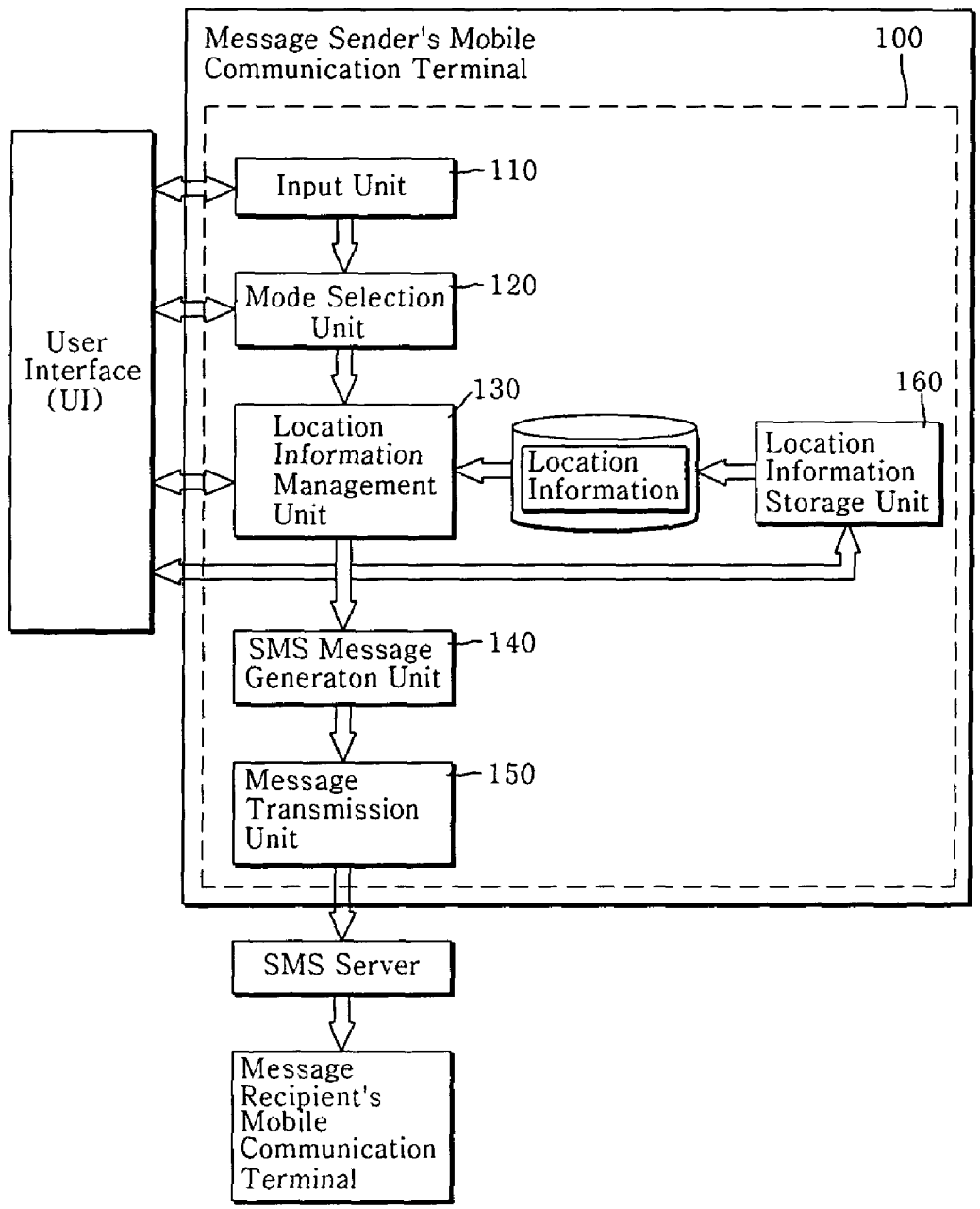
FIG. 1 is a block diagram showing a message sending module in a location-based SMS system in accordance with an embodiment of the present invention.

Exemplary embodiments in accordance with the present invention will now be described in detail with reference to the accompanying drawings. In the drawings, the same elements are denoted by the same reference numerals even though they are depicted in different drawings.

A mobile communication terminal equipped with a location-based short message service (SMS) system in accordance with the present invention comprises a message sending module, a message receiving module, and a controller (not shown) that controls the overall operation of the location-based SMS system.

The message sending module has a form of software that can be run in a mobile communication terminal of a message sender, such as mobile phone, personal digital assistant (PDA), or personal computer. The message sending module acts to receive a message from the message sender, receive a general message mode or a location-based message mode selected by the sender, and send an SMS message to a telephone number of a message recipient's mobile communication terminal.

The message receiving module has a form of software that can be run in the mobile communication terminal of the message recipient or an SMS server of a mobile carrier. The message receiving module acts to receive the SMS message from the message sending module, determine whether the received SMS message is a general message or location-based message, and display the received SMS message on the message recipient's mobile communication terminal if the SMS message is a general message, or, if the SMS message is a location-based message, display the received SMS message on the recipient's mobile communication terminal when the recipient's terminal enters into a location designated by the message sender.

Preferably, the message sending module and message receiving module are incorporated in a user's mobile communication terminal and are run on the user's mobile communication terminal.

The location-based SMS system according to the present invention will now be described in detail with reference to FIGS. 1 to 4.

FIG. 1 is a block diagram showing a message sending module in a location-based SMS system in accordance with an embodiment of the present invention.

The message sending module 100 comprises an input unit 110, a mode selection unit 120, a location information management unit 130, an SMS message generation unit 140, and a message transmission unit 150.

The input unit 110 is adapted to receive from a message sender a message content and a telephone number of a message recipient's mobile communication terminal. That is, the message sender, who desires to send an SMS message to a designated message recipient, inputs a message content and a telephone number of the recipient's mobile communication terminal using the sender's mobile communication terminal, such as mobile phone, PDA, or personal computer. At this time, the input unit 110 in the message sending module 100 offers a user interface (UI) to the message sender to receive the SMS message and then requests the recipient to input the SMS message. The sender inputs the message content and the telephone number of the recipient's terminal through the UI.

The mode selection unit 120 is adapted to select a general message mode or a location-based message mode according to the message sender's instruction. That is, the mode selection unit 120 in the message sending module 100 offers a UI used for selecting a mode to the message sender and requests the message sender to select the general message mode or location-based message mode. The sender selects a desired one of the modes through the UI:

The location information management unit 130 is adapted to receive location information from the message sender when the location-based message mode is selected by the mode selection unit 120. That is, when the message sender selects the location-based message mode through the UI provided by the mode selection unit 120, the location information management unit 130 of the message sending module 100 offers a UI used for inputting location information to the message sender and then requests the sender to input the location information. The sender inputs the location information through the UI.

The location information is necessary to output the location-based message through the message recipient's mobile communication terminal when the recipient's mobile communication terminal enters into a location corresponding to the location information. The recipient's mobile communication terminal retrieves the corresponding location from map information of a global positioning system (GPS) (not shown) incorporated therein, or from location information obtained from a base station (not shown) of a mobile communication system that periodically communicates with the recipient's terminal.

The SMS message generation unit 140 is adapted to generate an SMS message containing both the content inputted through the input unit 110 and mode identification information based on the mode selected by the mode selection unit 120. The location information inputted through the location information management unit 130 is included in the generated SMS message when the mode selected by the mode selection unit 120 is the location-based message mode.

In other words, when a mode selected by the mode selection unit 120 is a general message mode, the SMS message generation unit 140 of the message sending module 100 generates an SMS message containing the content inputted through the input unit 110 and mode identification information indicating the general message mode. Alternatively, when a mode selected by the mode selection unit 120 is a location-based message mode, the SMS message generation unit 140 generates an SMS message containing the content inputted through the input unit 110, mode identification information indicating the location-based message mode, and the location information inputted through the location information management unit 130.

The message transmission unit 150 is adapted to transmit to an SMS server the SMS message, which is generated by the SMS message generation unit 140 and is set to be forwarded to a telephone number of the message recipient's mobile communication terminal as a destination. In other words, when the message sender inputs a command to send the SMS message generated by the SMS message generation unit 140, the message transmission unit 150 of the message sending module 100 transmits the generated SMS message which is set to be forwarded to the telephone number of the message recipient's mobile communication terminal as a destination. The transmitted SMS message is in turn sent to the recipient's mobile communication terminal via an SMS server in a mobile communication system.

In this manner, the message sending module 100 of the location-based SMS system in accordance with the present invention generates a location-based message and sends it to the message recipient's mobile communication terminal.

Figure 2:
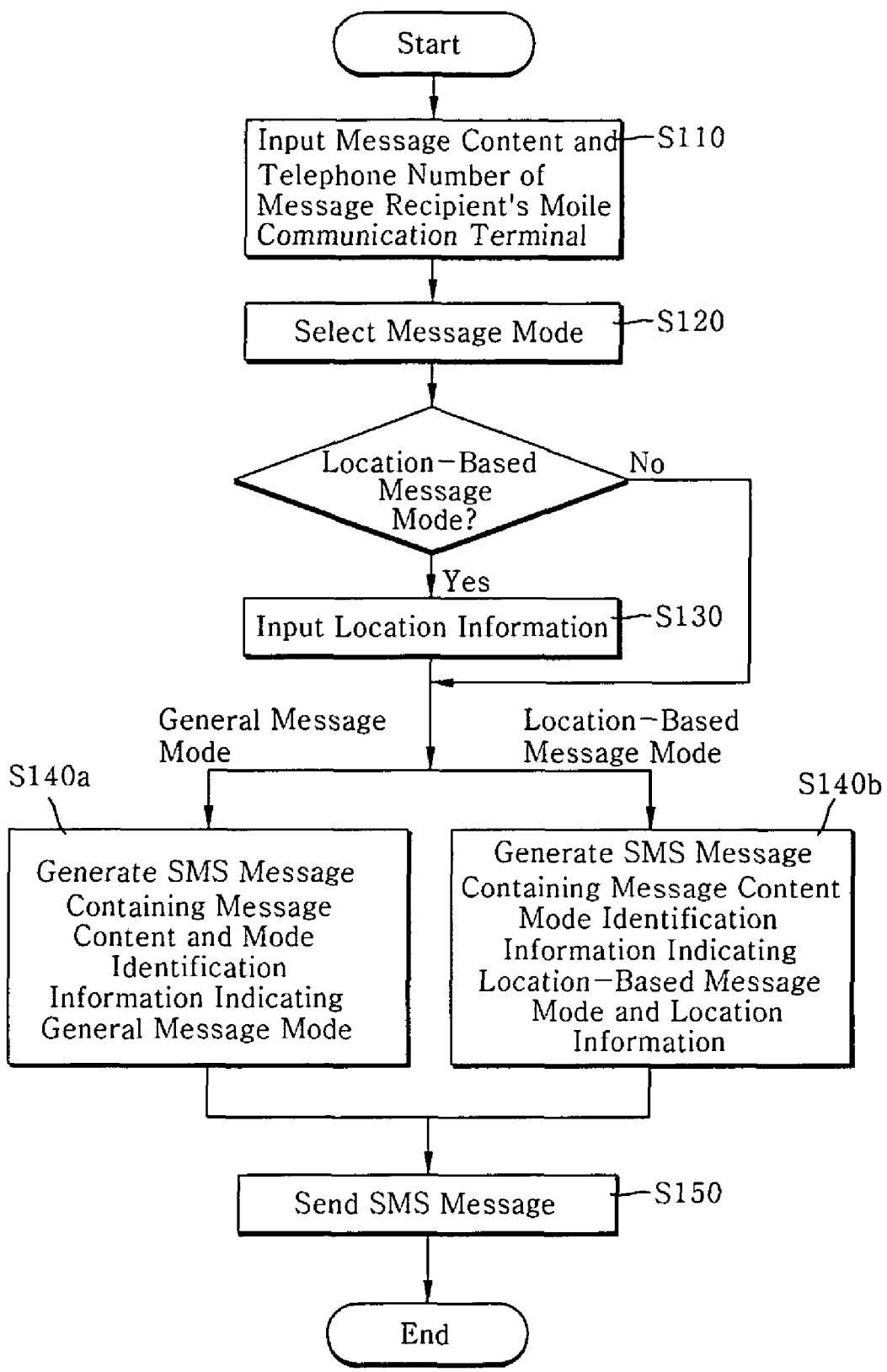
FIG. 2 is a flowchart showing a message sending process in the message sending module shown in FIG. 1.

A detailed description will now be given of the location-based message generation process with reference to FIG. 2, which is a flowchart showing a message sending process in the message sending module shown in FIG. 1.

First, a message sender executes the message sending module 100 through his/her mobile communication terminal, such as mobile phone, PDA, or personal computer, and then selects a message send menu.

In step S110, the message sending module 100 offers a UI to the message sender through the input unit 110 and receives message content and a telephone number of a message recipient's mobile communication terminal from the message sender through the UI.

In step S120, if the message sender presses a confirm button after entering the message content and telephone number, then the mode selection unit 120 of the message sending module 100 offers a UI used for selecting a mode to the message sender to make it possible to select the general message mode or location-based message mode according to the sender's selection through the UI. The input step S110 and the mode selection step S120 may be performed in reverse order.

In step S130, if the message sender selects the location-based message mode, the location information management unit 130 of the message sending module 100 offers a UI used for inputting location information to the sender and receives the location information from the sender through the UI. The location information is information about a location in which an SMS message is displayed on the message recipient's mobile communication terminal when the mobile communication terminal of the message recipient having received the SMS message enters into the location.

In step 140a, if a mode selected by the mode selection unit 120 is the general message mode, the SMS message generation unit 140 of the message sending module 100 generates an SMS message containing a message content inputted through the input unit 110 and mode identification information indicating the general message mode.

In step 140b, if a mode selected by the mode selection unit 120 is the location-based message mode, the SMS message generation unit 140 of the message sending module 100 generates an SMS message containing a message content inputted through the input unit 110, mode identification information indicating the location-based message mode, and the location information inputted through the location information management unit 130.

Once the SMS message is generated, the message sending module 100 inquires of the message sender whether or not to send the generated SMS message. In step S150, if the message sender presses an SMS message send button, then the message transmission unit 150 of the message sending module 100 transmits the generated SMS message which is set to be forwarded to the telephone number of the message recipient's mobile communication terminal as a destination. The transmitted SMS message is sent to the recipient's mobile communication terminal via an SMS server in a mobile communication system.

Alternatively, the message sending process of the message sending module may further include a location information storing step (not shown) of providing map information of a GPS incorporated in the message sender's mobile communication terminal to the sender and storing information regarding a location selected by the sender from the provided map information in a memory. In this case, the message sending module 100 may be implemented to read and input the location information stored in the memory according to the sender's selection in step S130.

The input step S110, the mode selection step S120, and the location information input step S130 may be changed in sequence.

In accordance with another preferred embodiment of the present invention, the message sending module 100 of the location-based SMS system may further include a location information storage unit 160.

The location information storage unit 160 is adapted to provide map information from a GPS (not shown) incorporated in the message sender's mobile communication terminal to the sender and store information regarding a location selected by the sender from the map information in a memory (not shown).

At this time, the location information management unit 130 is adapted to read and receive the location information, which is stored in the memory by the location information storage unit 160, according to the sender's selection.

In this case, the message sender can set and store location information to be contained in a location-based message in advance. That is, the location information storage unit 160 of the message sending module 100 offers map information to the message sender so that the message sender can select a location in which the location-based message is displayed on the message recipient's mobile communication terminal when the mobile communication terminal of the recipient expected to receive the location-based message enters into the location. Further, the location information storage unit 160 stores the location information selected by the message sender in the sender's mobile communication terminal in advance. As a result, the message sender can include location information in the location-based message by searching location information stored in the location information storage unit 160 using the location information management unit 130 when generating the location-based message, and then selecting desired location information to be contained in the location-based message.

Figure 3:
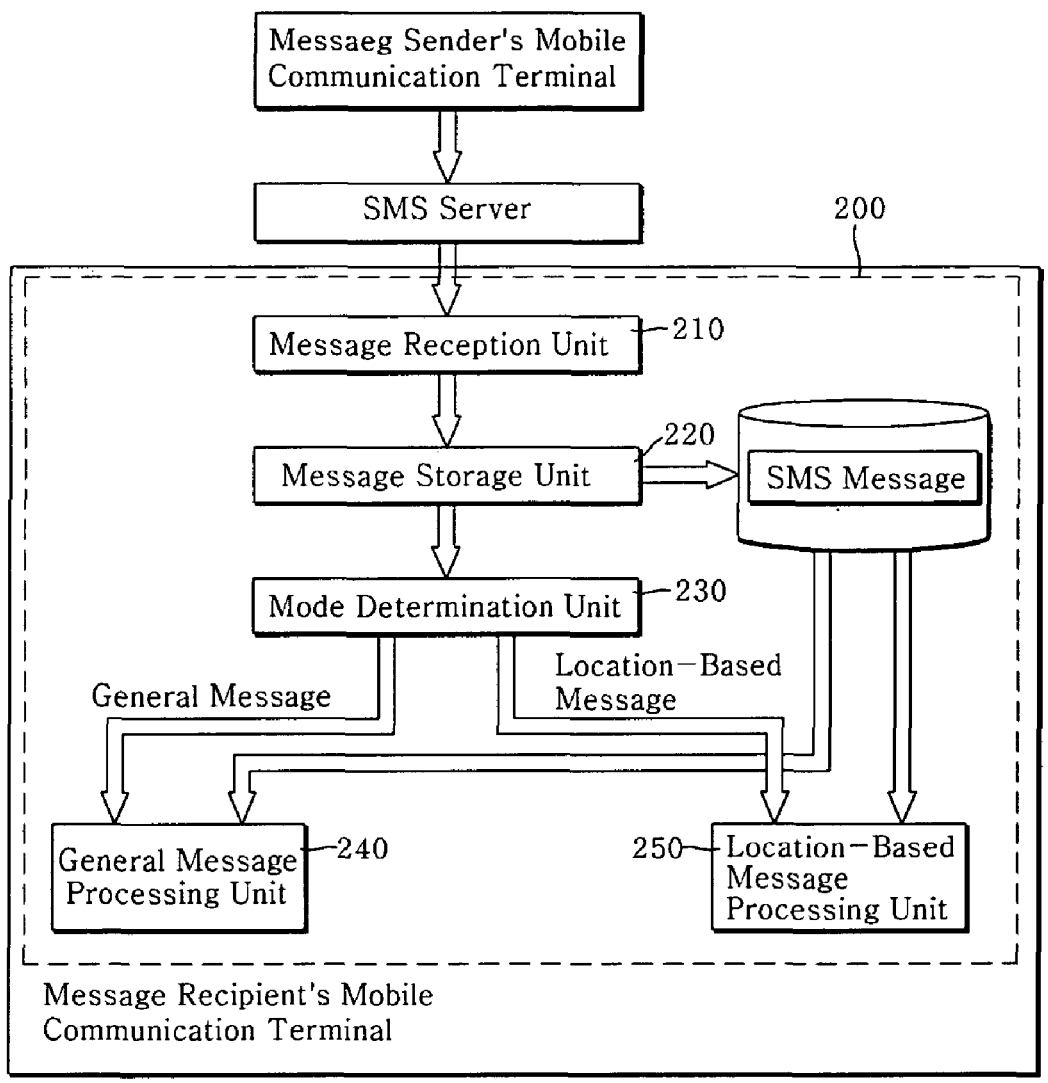
FIG. 3 is a block diagram showing a message receiving module in a location-based SMS system in accordance with an embodiment of the present invention.

FIG. 3 is a block diagram showing a message receiving module in the location-based SMS system in accordance with an embodiment of the present invention.

A message receiving module 200 has a form of software that can be run in a mobile communication terminal of a message recipient, and includes a message reception unit 210, a message storage unit 220, a mode determination unit 230, a general message processing unit 240, and a location-based message processing unit 250.

The message reception unit 210 is adapted to receive an SMS message from an SMS server. That is, an SMS message from a mobile communication terminal of a message sender is sent to the message recipient's mobile communication terminal through an SMS server in a mobile communication system. The message reception unit 210 in the message receiving module 200, which is run in the recipient's terminal, receives the SMS message from the SMS server.

The message storage unit 220 is adapted to store the SMS message received by the message reception unit 210 in a memory. That is, if the SMS message is received by the message reception unit 210, then it is stored in a memory of the message recipient's mobile communication terminal by the message storage unit 220 of the message receiving module 200.

The mode determination unit 230 is adapted to determine from mode identification information contained in the received SMS message whether the SMS message is a general message or location-based message. That is, the mode determination unit 230 in the message receiving module 200 checks mode identification information recorded in an information field of the SMS message sent from the message sender to determine whether the sent SMS message is a general message or location-based message. The mode identification information is preferably a parity bit of '0' or '1' indicating whether the SMS message is a general message or location-based message. As a result, the mode determination unit 230 can determine from the parity bit whether the received SMS message is a general message or location-based message.

The general message processing unit 240 is adapted to output content contained in the received SMS message if the SMS message is determined by the mode determination unit 230 to be a general message. That is, in the case where the SMS message sent from the message sender is determined to be a general message by the mode determination unit 230, the general message processing unit 240 of the message receiving module 200 displays the content of the sent SMS message on the message recipient's mobile communication terminal so that the recipient can view the message content, as in a conventional SMS system.

On the other hand, if the received SMS message is determined to be a location-based message by the mode determination unit 230, the location-based message processing unit 250 is adapted to output the content contained in the SMS message when the message recipient's mobile communication terminal enters into a location corresponding to location information contained in the SMS message. Preferably, the location-based message processing unit 250 determines whether the recipient's terminal has entered into the location corresponding to the location information in the SMS message, by periodically monitoring locations of the recipient's terminal through a GPS (not shown) incorporated in the recipient's terminal. Such a location tracking technique using the GPS is well known in the art and a detailed description thereof will thus be omitted.

That is, in the case where the SMS message sent from the message sender is determined to be a location-based message by the mode determination unit 230, the location-based message processing unit 250 in the message receiving module 200 periodically checks whether the message recipient's mobile communication terminal has entered into the location corresponding to the location information contained in the sent SMS message. Upon entry of the recipient's terminal into the corresponding location, the location-based message processing unit 250 reads the location-based message stored in the memory and displays message content on the recipient's terminal so that the recipient can view the message content.

Figure 4:
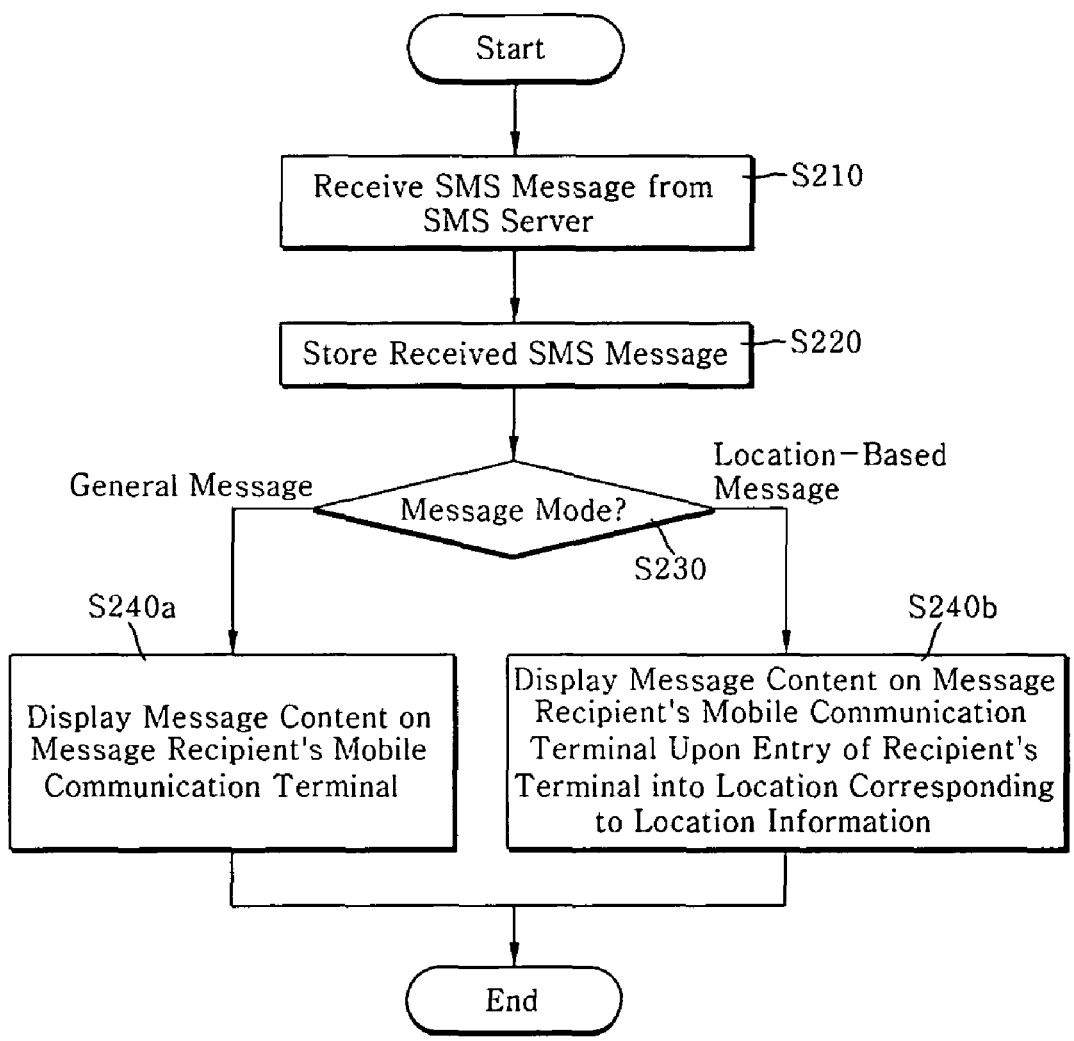
FIG. 4 is a flowchart showing a message receiving process in the message receiving module shown in FIG. 3.

A detailed description will hereinafter be given of the location-based message display process with reference to FIG. 4, which is a flowchart showing a message receiving process in the message receiving module shown in FIG. 3.

In step S210, when an SMS message is sent from the SMS server in the mobile communication system, the message reception unit 210 in the message receiving module 200 receives the sent SMS message. In step S220, the message storage unit 220 stores the received SMS message in the memory of the message recipient's mobile communication terminal.

In step S230, the mode determination unit 230 in the message receiving module 200 determines from mode identification information contained in the received SMS message whether the SMS message is a general message or location-based message.

If the received SMS message is determined to be a general message in step S230, the general message processing unit 240 in the message receiving module 200 displays the content of the received SMS message on the message recipient's mobile communication terminal in step S240a so that the recipient can view the message content, as in a conventional SMS system.

On the other hand, if the received SMS message is determined to be a location-based message in step S230, the location-based message processing unit 250 of the message receiving module 200, in step S240b, periodically checks whether the message recipient's mobile communication terminal has entered into a location corresponding to location information contained in the received SMS message, and reads and outputs the location-based message stored in the memory of the terminal when the recipient's terminal has entered into the corresponding location.

Preferably, in step S240b, the location-based message processing unit 250 periodically checks through the GPS incorporated in the message recipient's mobile communication terminal whether the terminal has entered into the location corresponding to the location information in the received SMS message.

As apparent from the above description, the present invention provides a mobile communication terminal equipped with a location-based SMS system, a location-based message generation method and a location-based message display method. Accordingly, it is possible to display the message on a mobile communication terminal of a message recipient when the recipient's terminal enters into a location designated by a message sender.

While the present invention has been described with reference to exemplary embodiments thereof, it will be understood by those skilled in the art that various changes in form and details may be made therein without departing from the scope of the present invention as defined by the following claims.

What is claimed is:

1. A mobile communication terminal including a SMS (short message service) system comprising a message sending module which receives from a message sender a message content, a telephone number of a mobile communication terminal of a designated message recipient, and a message mode selected by the message sender, generates from location information received from the message sender an SMS message containing the message content, mode identification information based on the message mode, and the location information if the message mode selected by the message sender is a location-based message mode rather than a general message mode, and sends to an SMS server the generated SMS message which is set to be forwarded to the telephone number of the message recipient's mobile communication terminal as a destination, wherein the mode identification information comprises a single parity bit, the single parity bit having a first value if the message mode is the location-based message mode, and having a second value if the message mode is the general message mode, the single parity bit indicates whether the SMS message is to be processed by a general message processing unit or a location-based message processing unit, and wherein the message sending module comprises:

an input unit which allows the message sender to input the message content and the telephone number of the mobile communication terminal of the designated message recipient;

a mode selection unit which allows the message sender to select the general message mode or location-based message mode;

a location information management unit which receives the location information from the message sender when the location-based message mode is selected in the mode selection unit;

an SMS message generation unit which generates an SMS message containing the message content inputted through the input unit and mode identification information based on the message mode selected through the mode selection unit, and, if the selected message mode is the location-based message mode, further containing the location information inputted through the location information management unit; and a message transmission unit which transmits to the SMS server the generated SMS message which is set to be forwarded to the telephone number of the message recipient's mobile communication terminal as a destination.

2. The mobile communication terminal of claim 1, wherein the SMS system further comprises a location information storage unit which offers location information to the message sender and stores information regarding a location retrieved and selected by the message sender from the offered location information in a memory.

3. The mobile communication terminal of claim 2, wherein the location information management unit is adapted to receive the location information stored by the location information storage unit from the memory according to the message sender's selection.

4. A mobile communication terminal including an SMS (short message service) system comprising a message receiving module to receive an SMS message from an SMS server, to store the received SMS message in a memory, to determine from mode identification information contained in the received SMS message whether the received SMS message is a general message or location-based message, and if the received SMS message is determined to be the location-based message, to output the received SMS message if the mobile communication terminal of a message recipient enters into a location corresponding to location information contained in the received SMS message, wherein the mode identification information comprises a single parity bit, the single parity bit having a first value if the SMS message is the location-based message, and having a second value if the SMS message is the general message, and the single parity bit indicates whether the SMS message is to be processed by a general message processing unit or a location-based message processing unit, and wherein the message receiving module comprises:

a message reception unit to receive the SMS message from the SMS server;

a message storage unit to store the received SMS message in a memory;

a mode determination unit to determine from mode identification information contained in the received SMS message whether the received SMS message is a general message or location-based message;

the general message processing unit to output the received SMS message if the received SMS message is determined by the mode determination unit to be a general message; and the location-based message processing unit to output the received SMS message if the received SMS message is determined by the mode determination unit to be a location-based message if the message recipient's mobile communication terminal enters into a location corresponding to location information contained in the received SMS message.

5. The mobile communication terminal of claim 4, wherein the location-based message processing unit is adapted to determine whether the message recipient's mobile communication terminal has entered into the location corresponding to the location information contained in the SMS message, by periodically monitoring locations of the recipient's mobile communication terminal based on location information obtained from a base station of a mobile communication system communicating with the recipient's mobile communication terminal.

6. The mobile communication terminal of claim 4, wherein the location-based message processing unit is adapted to determine whether the message recipient's mobile communication terminal has entered into the location corresponding to the location information contained in the SMS message, by periodically monitoring locations of the recipients mobile communication terminal through a GPS (global positioning system) incorporated in the recipient's mobile communication terminal.

7. A location-based message generation method comprising the steps of:

a) inputting a message content and a telephone number of a mobile communication terminal of a designated message recipient through a UI (user interface) offered to a message sender;

b) selecting a message mode according to the message sender's selection through the UI offered to the message sender to select a general message mode or a location-based message mode;

c) inputting location information through a UI offered to the message sender to input the location information upon selection of the location-based message mode by the message sender, the location information being information regarding a location in which an SMS message is to be displayed on a message recipient's mobile communication terminal when the message recipient's mobile communication terminal having received the SMS message enters into the location;

d) generating an SMS (short message service) message containing the message content and mode identification information indicating a general message mode if a mode selected in the step b) is a general message mode;

e) generating an SMS message containing the message content, mode identification information indicating a location-based message mode, and location information if a mode selected in the step b) is a location-based message mode; and f) sending the SMS message generated in the step d) or e), which is set to be forwarded to the telephone number of the message recipient's mobile communication terminal as a destination, wherein the mode identification information comprises a single parity bit, the single parity bit having a first value if the mode is the location-based message mode, and having a second value if the mode is the general message mode, and the single parity bit indicates whether the SMS message is to be processed by a general message processing unit or a location-based message processing unit.

8. The location-based message generation method of claim 7, further comprising offering location information to the message sender and storing information regarding a location selected by the sender from the offered location information in a memory.

9. The location-based message generation method of claim 8, wherein the step c) comprises reading and inputting the location information stored in the memory according to the message senders selection.

10. A location-based message display method comprising the steps of:

a) receiving an SMS (short message service) message from an SMS server in a mobile communication system;

b) storing the received SMS message in a memory of a mobile communication terminal of a message recipient;

c) determining from mode identification information contained in the received SMS message whether the received SMS message is a general message or a location-based message;

d) displaying the received SMS message on the message recipient's mobile communication terminal so that the message recipient can view the message content if the received SMS message is determined to be a general message; and e) monitoring periodically whether the message recipient's mobile communication terminal has entered into a location corresponding to location information contained in the received SMS message if the received SMS message is determined to be a location-based message, and reading and outputting the received SMS message stored in the memory of the message recipient's mobile communication terminal so that the message recipient can view the message content if the recipient's mobile communication terminal has entered into the location corresponding to the location information contained in the received SMS message, wherein the mode identification information comprises a single parity bit, the single parity bit having a first value if the SMS message is the location-based message, and having a second value if the SMS message is the general message, and the single parity bit indicates whether the SMS message is to be processed by a general message processing unit or a location-based message processing unit.

11. The location-based message display method of claim 10, wherein the step e) comprises determining whether the message recipient's mobile communication terminal has entered into the location corresponding to the location information contained in the SMS message, by periodically monitoring locations of the recipient's mobile communication terminal based on location information from a base station in a mobile communication system communicating with the recipient's mobile communication terminal.

12. The location-based message display method of claim 10, wherein the step e) comprises determining whether the message recipient's mobile communication terminal has entered into the location corresponding to the location information contained in the SMS message, by periodically monitoring locations of the recipient's mobile communication terminal through a GPS incorporated in the recipient's mobile communication terminal.

* * * * *